(12) United States Patent
Yuan et al.

(10) Patent No.: US 12,462,459 B2
(45) Date of Patent: Nov. 4, 2025

(54) ENCODER-OPTIMIZED TEXT RENDERING

(71) Applicant: Axis AB, Lund (SE)

(72) Inventors: Song Yuan, Lund (SE); Ludvig Hassbring, Lund (SE); Jessica Nilsson, Lund (SE)

(73) Assignee: AXIS AB, Lund (SE)

( * ) Notice: Subject to any disclaimer, the term of this patent is extended or adjusted under 35 U.S.C. 154(b) by 235 days.

(21) Appl. No.: 18/532,227

(22) Filed: Dec. 7, 2023

(65) Prior Publication Data
US 2024/0221256 A1     Jul. 4, 2024

(30) Foreign Application Priority Data
Dec. 27, 2022 (EP) .................................... 22216692

(51) Int. Cl.
| | | |
|---|---|---|
| *G06T 11/60* | (2006.01) | |
| *G06T 3/40* | (2024.01) | |
| *G06T 3/60* | (2024.01) | |
| *H04N 19/172* | (2014.01) | |
| *H04N 19/60* | (2014.01) | |

(52) U.S. Cl.
CPC ............... *G06T 11/60* (2013.01); *G06T 3/40* (2013.01); *G06T 3/60* (2013.01); *H04N 19/172* (2014.11); *H04N 19/60* (2014.11)

(58) Field of Classification Search
CPC ... G06T 11/60; G06T 3/40; G06T 3/60; G06T 9/00; G06T 11/203; H04N 19/172; H04N 19/60; H04N 19/85; G06F 40/109
USPC ........................................................ 345/619
See application file for complete search history.

(56) References Cited

U.S. PATENT DOCUMENTS

| | | | |
|---|---|---|---|
| 5,301,027 A | 4/1994 | Kiyofuji et al. | |
| 5,731,839 A | 3/1998 | Panaro | |
| 8,306,356 B1* | 11/2012 | Bever | G06V 30/268 |
| | | | 382/292 |
| 2005/0226516 A1 | 10/2005 | Kimura et al. | |
| 2013/0304604 A1* | 11/2013 | Hoffman | G06Q 30/0621 |
| | | | 705/26.5 |
| 2016/0078656 A1* | 3/2016 | Borson | G06F 16/51 |
| | | | 345/472 |

(Continued)

FOREIGN PATENT DOCUMENTS

JP          10-178638 A     6/1998

OTHER PUBLICATIONS

Novelty Search UppdragsHuset (Oct. 2022).

(Continued)

*Primary Examiner* — David T Welch
(74) *Attorney, Agent, or Firm* — Volpe Koenig

(57) ABSTRACT

A method for rendering a text string in a digital raster image suitable for block-wise transform coding, the method comprising: obtaining a partition of an image area into coding blocks for the block-wise transform coding; representing the text string as a plurality of graphical elements from a typeface which are arranged according to a tentative layout in the image area, wherein the tentative layout defines at least a position, orientation and size of each graphical element; modifying the tentative layout by applying a spectrum sparsening operation to at least one nonempty coding block, thereby obtaining a modified layout; and rendering a digital raster image of the graphical elements arranged according to the modified layout.

17 Claims, 8 Drawing Sheets

(56) References Cited

U.S. PATENT DOCUMENTS

2016/0357717 A1* 12/2016 Metz .................... G06T 13/80
2018/0247386 A1*  8/2018 Zheng ................ G06V 30/245
2019/0020885 A1   1/2019 Park et al.
2021/0286869 A1   9/2021 Liu et al.
2024/0303870 A1*  9/2024 Cao ...................... G06T 9/002

OTHER PUBLICATIONS

Hu et al, "Screen Content coding for HEVC using edge modes" 2013 IEEE International Conference on Acoustics, Speech and Signal Processing, Vancouver, BC, Canada, (2013).

Tang et al., "TSA-SCC: Text Semantic Aware Screen Content Coding with Ultra Low Bitrate" in IEEE Transactions on Image Processing (2022).

Manju et al. "Sparse Decomposition Technique for Segmentation and Compression of Compound Images" Journal of Intelligent Systems, (2020).

Jamal et al., "Arabic text justification." (2006).

Extended European Search Report dated May 25, 2023 for European Patent Application No. 22216692.8.

* cited by examiner n n *n*

ENCODER-OPTIMIZED TEXT RENDERING

FIELD OF INVENTION

The present disclosure relates to the field of two-dimensional image data generation. In particular, it presents techniques for rendering text in a raster image suitable for block-wise transform coding.

TECHNICAL BACKGROUND

Thanks to the remarkable progress in the field of digital image coding, it is possible to represent an input image as a bitstream with very low bitrate, from which the image can be reconstructed without significant degradation of its visual quality. In some use cases, the input image is fixed, e.g., it has been recorded by a camera or synthesized in advance. Then, the digital image coding process can usually control the bitrate of the bitstream only by applying various data compression techniques, including lossy and non-lossy compression. In other use cases, the input image may be amenable to modifications within certain limits. This applies in particular when the input image is to be synthesized (rendered) concurrently with the image coding and the synthesis shall fulfil an end user's rendering specification that leaves some aspects undefined. For example, the rendering specification may define the geometry and positions of a number of three-dimensional objects but does not specify their colors and textures and/or does not specify the illumination of the scene. In other words, the person or device in charge of the rendering has freedom to choose said colors, textures or illumination at the time of rendering, and each choice will be acceptable to the end user. The end user may be a person (e.g., consumer) who is going to view the reconstructed image, a processor that performs optical character recognition (OCR) on the reconstructed image, or indeed a system owner on whose behalf the image coding is performed.

The inventors have realized that this freedom can be utilized to improve the performance of the image coding process. Notably, they have discovered an untapped potential in the field of text rendering.

SUMMARY

One objective of the present disclosure is to make available a method for rendering a text string in a digital raster image in such manner that the digital raster image is suitable for block-wise transform coding. A further objective is to make available a text rendering method for producing a digital raster image with a sparse spectrum. A further objective is to make available such a method that meets one or more layout constraints. A further objective is to make available a text rendering method suitable for generating overlay text to be encoded together with a background digital image. A still further objective is to propose a device and computer program with these capabilities.

At least some of these objectives are achieved by the disclosure as defined by the independent claims. The dependent claims relate to advantageous embodiments.

In a first aspect of the present disclosure, there is provided a method for rendering a text string in a digital raster image suitable for block-wise transform coding. The text string is predefined from the point of view of the entity performing the method, i.e., the text string may be received from an end user (see discussion above) or created by an executing software application, and said entity must not modify the text string. The method comprises: obtaining a partition of an image area into coding blocks for the block-wise transform coding; representing the text string as a plurality of graphical elements from a typeface which are arranged according to a tentative layout in the image area, wherein the tentative layout defines at least a position, orientation and size of each graphical element; modifying the tentative layout by applying a spectrum sparsening operation to at least one nonempty coding block, thereby obtaining a modified layout; and rendering a digital raster image of the graphical elements arranged according to the modified layout.

A spectrum sparsening operation (or, by another term, a spectral sparsification operation) makes the spectrum of a coding block of the digital raster image sparser than if the spectrum sparsening operation had not been performed. This is to say, the spectrum sparsening operation is likely to reduce the number of nonzero transform coefficients that the block-wise transform coding produces when it is applied to the coding block. This means, in turn, that the digital raster image can be encoded at marginally lower bitrate. The inventors have realized that spectrum sparsening is a key facilitator for efficient image encoding, and they have developed a class of advantageous spectrum sparsening operations which are non-destructive when applied to a text string. More precisely, the spectrum sparsening operation modifies the tentative layout (subject to optional layout constraints) but preserves the text string. It may be considered that the method according to the first aspect is a way of bringing the text rendering process and the subsequent image encoding process closer together, for thereby exploiting synergies between these processes. This way, the encoded image with the rendered text string utilizes the available amount of communication bandwidth or storage space in a system more efficiently.

The spectrum sparsening operation, which will be specified further in what follows, can be characterized as a model-based, open-loop operation that does not presuppose any interaction with the subsequent image encoding process. The spectrum sparsening method is model-based in the sense that its effect on the digital raster image can be predicted accurately, on the basis of a large body of experience that the inventors have accumulated. The model-based, open-loop approach allows an economical use of processing resources and execution time, which ensures that the method according to the first aspect is suitable for important mass-market use cases. The spectrum sparsening operation is not rightly characterized as a trial-and-error approach. By contrast, a model-free, closed-loop approach for achieving a comparable bitrate reduction is likely to be more computationally costly. The closed-loop approach could for example include an iterative search where each iteration includes (1) rendering the text string with a new layout, (2) encoding the image and (3) evaluating the change in size of the encoded image, until a satisfactory size has been reached. Because the iterative search is not guided by experience about how the digital image's spectrum responds to layout modification, the iterative search is likely less efficient than the method proposed herein. For example, a significant number of the encoding operation (2) may be required for each image. Equally poor performance can be expected from a model-free approach where the text string is rendered for a number of randomly generated layouts, and the best-performing layout is selected based on the size of the encoded image.

In some embodiments, the spectrum sparsening operation includes one or more of: rotation of a graphical element, slanting of a graphical element, isotropic or anisotropic rescaling of a full graphical element, isotropic or anisotropic rescaling of a graphical element of a portion of a graphical element, translation of a graphical element, a typeface modification, a typeface substitution, a contrast modification. The inventors have discovered specific guidelines for use with these subtypes of the spectrum sparsening operation, to be discussed in detail below.

In particular, the spectrum sparsening operation may consist of a rigid transformation of the graphical element, such as a rotation, slanting or a translation.

In some embodiments, the method further comprises obtaining one or more layout constraints specifying a typeface, a maximum extent, a minimum extent and/or an orientation.

In some embodiments, the block-wise transform coding may include a projection on an orthogonal basis of biperiodic functions followed by a round-to-zero operation.

In some embodiments, the graphical elements include glyphs, such as characters.

A second aspect of the present disclosure relates to devices arranged to perform the method of the first aspect. These devices may have a different main purpose, such as image or video editing, image or video content management, video subtitling, image or video playback, word processing, or may include other authoring tools. Further, the devices may be designed for a particular use case, such as indoor or outdoor video monitoring, with an automatic annotation functionality which overlays a text string. The devices within the second aspect of the disclosure generally share the effects and advantages of the first aspect, and they can be embodied with an equivalent degree of technical variation.

The present disclosure further relates to a computer program containing instructions for causing a computer to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which:

FIG. 7 illustrates a spectrum sparsening operation that includes slanting a graphical element;

FIGS. 8, 9 and 10 illustrate spectrum sparsening operations that include local and/or anisotropic rescaling of graphical elements;

DETAILED DESCRIPTION

The aspects of the present disclosure will now be described more fully hereinafter with reference to the accompanying drawings, on which certain embodiments of the disclosure are shown. These aspects may, however, be embodied in many different forms and should not be construed as limiting; rather, these embodiments are provided by way of example so that this disclosure will be thorough and complete, and to fully convey the scope of all aspects of the disclosure to those skilled in the art. Like numbers refer to like elements throughout the description.

Figure 1:
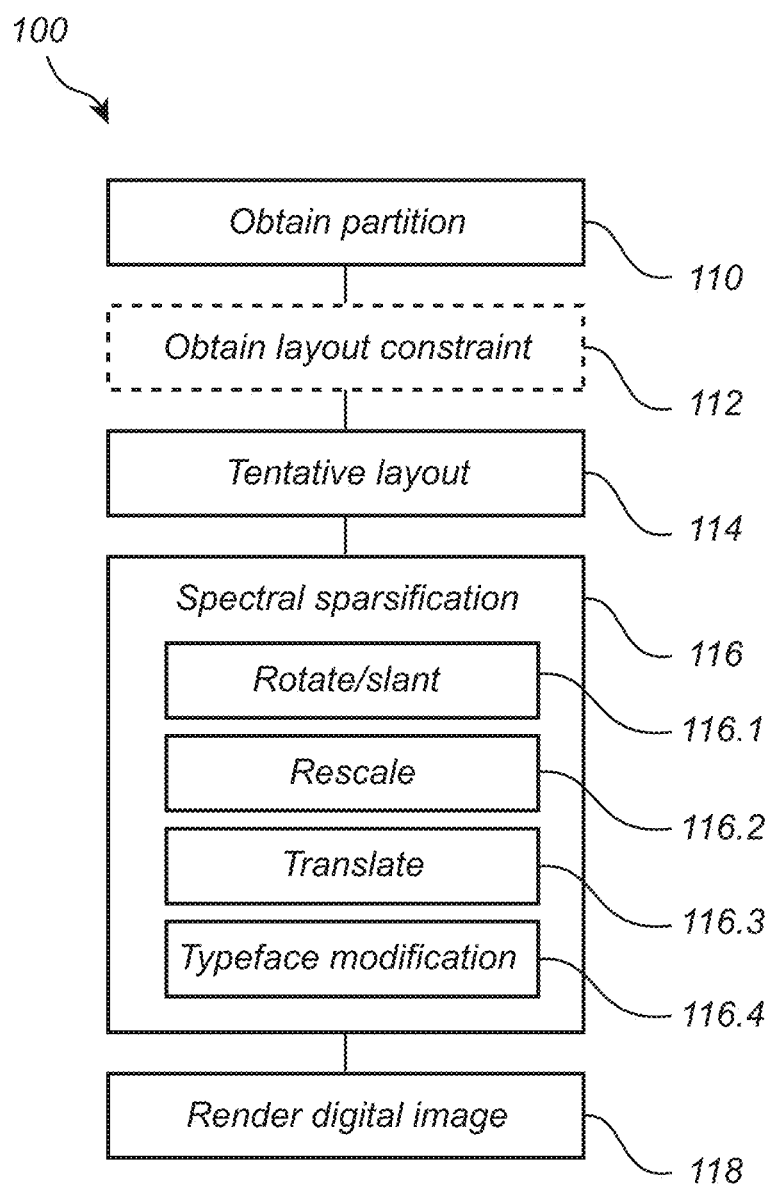
FIG. 1 is a flowchart of a method for rendering a text string in a digital image.

With reference to FIG. 1, a method 100 for rendering a text string in a digital raster image suitable for block-wise transform coding will now be described.

Figure 3:
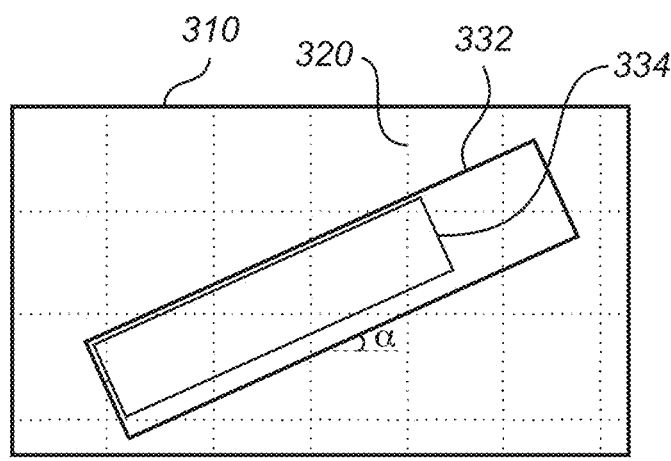
FIG. 3 illustrates a framework for specifying certain layout constraints.

It is understood that a raster image includes a matrix or a grid of pixels, wherein the pixels are preferably square-shaped or rectangular. The pixels form an image area 310 (FIG. 3). The raster image may be a pixel-buffer image in block format. An image with graphical elements in vector format is not a raster image.

It is understood that a text string is an ordered sequence of characters selected from a predefined character table, such as the Unicode table (ISO/IEC 10646). The characters may represent letters, syllables, ideographs, modifier letters, marks, numbers, punctuations marks, mathematical symbols, currency symbols, separators, ligatures etc.

It is furthermore understood that transform coding, in broad terms, includes projecting the image data on an orthogonal basis of biperiodic functions $\{\rho_{k_1,k_2}(n_1, n_2): k_1, k_2 \geq 0\}$:

$$X_{k_1,k_2} = \sum_{n_1=0}^{N_1-1} \sum_{n_2=0}^{N_2-1} x_{n_1,n_2} \rho_{k_1,k_2}(n_1, n_2) \quad (1)$$

where $X_{k_1, k_2}$ is a transform coefficient and $x_{n_1, n_2}$ is image data for pixel $(n_1, n_2)$. It is noted that the restriction of $\rho_{k_1,k_2}(n_1, n_2)$ to $[0, N_1] \times [0, N_2]$ may, for the lowest $(k_1, k_2)$ pairs correspond to a single period or a constant value. In particular, the basis may consist of real-valued biperiodic harmonic functions (e.g., DCT, DST, DFT, wavelet transform). The transform coefficients computed in the projection operation constitute a discrete representation of the spectrum of the image data. The encoded image includes the transform coefficients, possibly after non-destructive data compression (e.g., entropy, Huffman, Lempel-Ziv, run-length, binary or non-binary arithmetic coding, such as context-adaptive variable-length coding, CAVLC, context-adaptive binary arithmetic coding, CABAC) and/or other processing steps. In particular, the transform coefficients may undergo a round-to-zero operation, e.g., a quantization operation. The rounding operation is significant because when the transform coefficients are fed to one of the mentioned non-destructive data compression techniques, the zero transform coefficients will typically be coded not as zero-valued numbers ("0.0") but can be omitted in such manner that they occupy significantly less space in the image bitstream than nonzero transform coefficients. The intended transform coding is a block-wise transform in the sense that the processing of a coding block is independent from the processing of other coding blocks.

Optionally, the transform coefficients of the coding blocks can be encoded predictively, and by intra-frame prediction ('intra prediction')) coding in particular. According to such predictive coding techniques, which are well-known as such, the transform coefficients of one coding block are expressed incrementally with reference to one or more earlier or later coding blocks. This leads to efficient data compression, especially if the image depicts a natural scene with a high degree of spatial autocorrelation. The inventors have realized that the data compression is generally more significant if the spectra of the coding blocks are sparse, i.e., if they contain a large fraction of zero transform coefficients.

In a first step 110 of the method 100, a partition 320 of the image area 310 is obtained. The partition 320 may be obtained as a predefined partition (e.g., according to prior agreement or a standard specification), based on instructions from an end user, or it may be generated by the entity performing the method 100. The partition 320 defines a set of coding blocks such each point of the image area 310 belongs to a coding block. Equivalently, the union of the coding blocks is equal to the image area 310. In FIG. 3, the partition 320 is illustrated by dotted lines which delimit the coding blocks. The same dotted-line notation is used to illustrate boundaries of coding blocks in FIGS. 5, 6, 10 and 13 to 19. When the image is a frame of a video sequence, the coding blocks may be macroblocks in the sense of an ITU-T H.26x video coding standard; they can be transform blocks or prediction blocks, or block with both of these uses. It is noted that FIG. 3 is a simplified drawing for illustration purposes only. In common use cases at the time of the disclosure, it is customary to use a much finer partition. For example, macroblocks in a video frame could be 4×4 pixels, 8×8 pixels, 16×16 pixels, 32×32 pixels or 64×64 pixels.

Figures 20, 21:
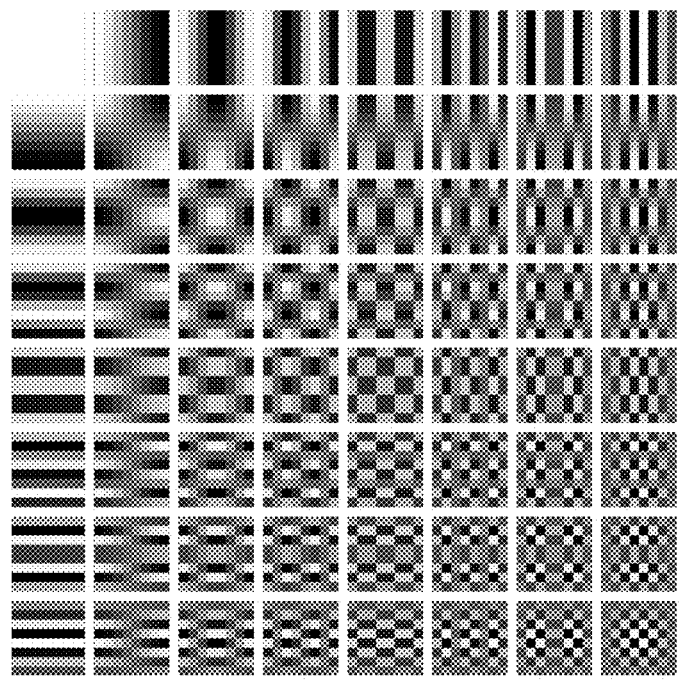
FIG. 21 is a plot of an orthogonal basis of biperiodic functions for coding blocks of 8×8 pixels each.

FIG. 21 contains 64 plots, each in the ($n_1$, $n_2$) plane, of a basis of real-valued biperiodic functions defined, for the 8×8 pixel case, as discrete cosine functions:

$$\rho_{k_1,k_2}(n_1, n_2) = \cos\left[\frac{\pi}{N_1}\left(n_1 + \frac{1}{2}\right)k_1\right]\cos\left[\frac{\pi}{N_2}\left(n_2 + \frac{1}{2}\right)k_2\right].$$

The top line in FIG. 21 contains the plots of $$\rho_{0,0}(n_1, n_2), \rho_{1,0}(n_1, n_2), \rho_{2,0}(n_1, n_2), \ldots, \rho_{7,0}(n_1, n_2),$$

and a plot of to $\rho_{7,7}(n_1, n_2)$ is found in the lower right corner. In FIG. 21, white color represents $\rho_{k_1,k_2}(n_1, n_2)=1$ and black color $\rho_{k_1,k_2}(n_1, n_2)=0$. Coding blocks that correspond to a single basis function or a linear combination of a small number of basis functions will be relatively cheaper to encode (i.e., will have a sparser spectrum) than coding blocks with a complex appearance and/or a high information content, which will have to be formed by a larger number of basis functions. It can be realized based on inspection of FIG. 21 that coding blocks with equidistant horizontal or vertical lines are likely cheap to encode, e.g., using basis functions $\rho_{k_1,k_2}$ with $k_1=0$ or $k_2=0$. Coding blocks with mainly diagonal elements are generally cheap to encode as well, e.g., using $\rho_{k_1,k_2}$ with $k_1=k_2$. It follows by the Nyquist-Shannon sampling theorem that $$\{\rho_{k_1,k_2}(n_1, n_2): 0 \leq k_1, k_2 \leq 7\}$$

is a complete basis for an 8×8 pixel coding block.

The text string to be rendered constitutes input data to the method 100. This is to say, the text string is predefined from the point of view of the entity performing the method, i.e., the text string may be received from an end user or created automatically by a software application, and said entity must not modify the text string in normal conditions. The method 100 may optionally accept one or more layout constraints as input. The layout constraints, which are obtained in an optional second step 112, specify a maximum extent 332 (FIG. 3) of the rendered text string, a minimum extent 334 of the rendered text string and/or an orientation a of the rendered text string. The layout constraints may further specify one or more acceptable typefaces. The text string is to be rendered in accordance with these layout constraints, which may sometimes restrict the effectiveness of the spectrum sparsening operation to be performed.

In a third step 114, the text string is represented as a plurality of graphical elements from a typeface which are arranged according to a tentative layout in the image area 310. The tentative layout defines at least a position, orientation and size of each graphical element. The graphical element may include glyphs, and in particular glyphs that represent characters. It is emphasized that a graphical element in this sense is not an abstract character but refers to the specific representation of the character in this typeface, i.e., with a concrete shape. Further, the characters of the text string and the graphical elements are not necessarily is a one-to-one relationship, but they may be in a one-to-many or many-to-one relationship. The graphical elements may be represented as vector graphics, e.g., scalable lines, curves or polygons.

In a next step 116, the tentative layout is modified by applying a spectrum sparsening operation. The spectrum sparsening operation can be applied to a single coding block at a time, to a group of coding blocks (e.g., contiguous coding blocks) at a time, or to the entire image area 310. The spectrum sparsening operation is preferably restricted to nonempty coding blocks, i.e., such coding blocks that contain at least one graphical element or a portion of a graphical element. As will be described in detail below, the spectrum sparsening operation may include a rotation of a graphical element (step 116.1), slanting of a graphical element (step 116.1), isotropic or anisotropic rescaling of a full graphical element (step 116.2), isotropic or anisotropic rescaling of a graphical element of a portion of a graphical element (step 116.2), translation of a graphical element (step 116.3), a typeface modification (step 116.4), a typeface substitution or a contrast modification (step 116.4), or various combinations of these.

The output of step 116 is a modified layout, which forms the basis for a fifth step 118, in which a digital raster image of the graphical elements according to the modified layout is rendered. The rendering may include rasterization, i.e., a conversion of vector graphics as a matrix of pixels. The rasterization may include executing a line- or curve-drawing algorithm. Alternatively, if the typeface represents the graphical elements as bitmaps, the rendering in step 118 may include combining such bitmaps into the output digital raster image using their sizes and positions according to the modified layout.

The rendering may be executed as a single operation on the entire image area or on each coding block separately.

Step 118 may further include a preprocessing step before the actual rendering. In the preprocessing step, some groups of the graphical elements arranged according to the modified layout are joined, such as by deforming (extending) parts of the graphical elements towards each other and/or by adding ligatures or connectors. The resulting joined appearance may be mandatory in certain non-Latin scripts, including Arabic, and it can be used as an option in Latin script to resemble cursive writing.

Figure 2:
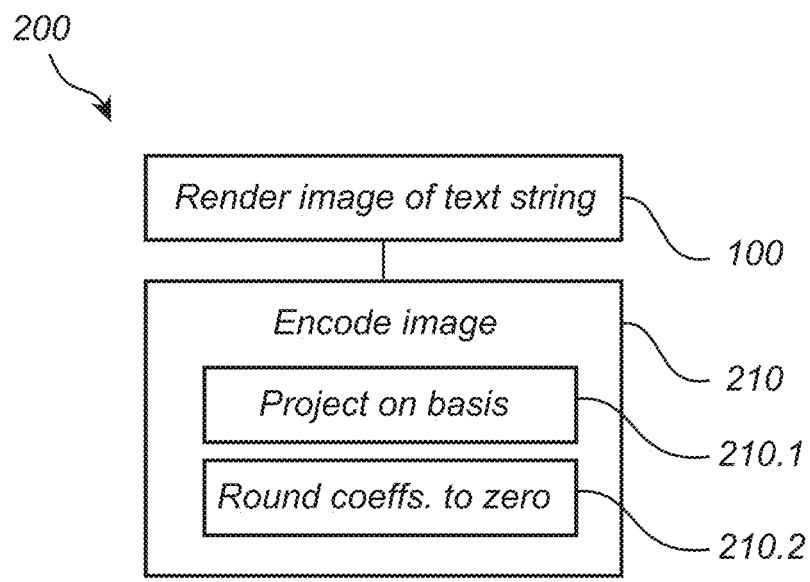
FIG. 2 is a flowchart of a method for providing an encoded digital image with a rendered text string.

As shown in FIG. 2, the text rendering method 100 just described may be embedded in a method 200 for providing an encoded digital image of a text string. Such a method 200 may include rendering a digital raster image of the text string by performing the method 100. After this, a block-wise transform coding operation 210 is applied to each block of said partition 320 of the image area. The transform coding may include a projection 210.1 on an orthogonal basis of biperiodic functions (see equation 1 above) followed by a round-to-zero operation 210.2. The output of the method 200 is an encoded digital image, which may be represented as a collection of transform coefficient values with a predefined coding.

Embodiments of the method 200 may be specifically adapted for the use case of text overlay. In such embodiments, a background image is obtained (e.g., received from an end user, recorded by a camera, etc.) and is combined with the digital raster image rendered in step 118. For example, the pixels that represent rendered graphical elements may be substituted for corresponding pixels in the background image; the complement of these pixels are treated as transparent, i.e., the background image is not affected here. The block-wise transform coding operation 210 is applied to the combined image. Optionally, the pixels that represent rendered graphical elements may be superimposed with a configurable degree of transparency, so that the background image is partially visible through the text. It is understood that the background image and the digital raster image may have to be adapted to one another before the combining, e.g., by a rescaling, cropping or extension operation.

Alternatively, the text string is represented (step 114) on top of the background image, and the spectrum sparsening operation (step 116) is applied to the combination of the background image and text string according to the tentative layout. This enables the spectrum sparsening operation to exploit synergies with the background image, e.g., by causing the arranged graphical elements to resemble the background image in some coding blocks, so that the spectrum is sparser and thus cheaper to encode. For example, the spectrum sparsening operation if successful could identify layout modifications in a coding block such that the spectrum of the overlaid graphical elements leaves roughly the same transform coefficient zero-valued as those transform coefficient that are zero-valued in the spectrum of the background image in the same coding block.

The methods 100, 200 can be executed by a general-purpose computer. In particular, they can be executed by a device with the basic functional structure shown in FIG. 4. As illustrated, device 400 includes processing circuitry 414, memory 410 and an external interface 418. An internal data bus 416 facilitates communication among these components. The memory 410 may be suitable for storing a computer program 412 with instructions implementing any of the methods 100, 200. The external interface 418 may be a communication interface allowing the device 400 to communicate with an analogous device (not shown) operated by a consumer or a video content author (e.g., a recording device) over a wide-area or local-area network 420. Further, the device 400 may communicate with a host computer 430, such as a server for storing raw or encoded image data, typefaces etc., or a networked ('cloud') processing resource that can be utilized by the device 400 as needed. It is understood that the host computer 430 could be configured to offload the device 400 of computationally demanding operations within the methods 100, 200.

Figures 4, 5, 6:
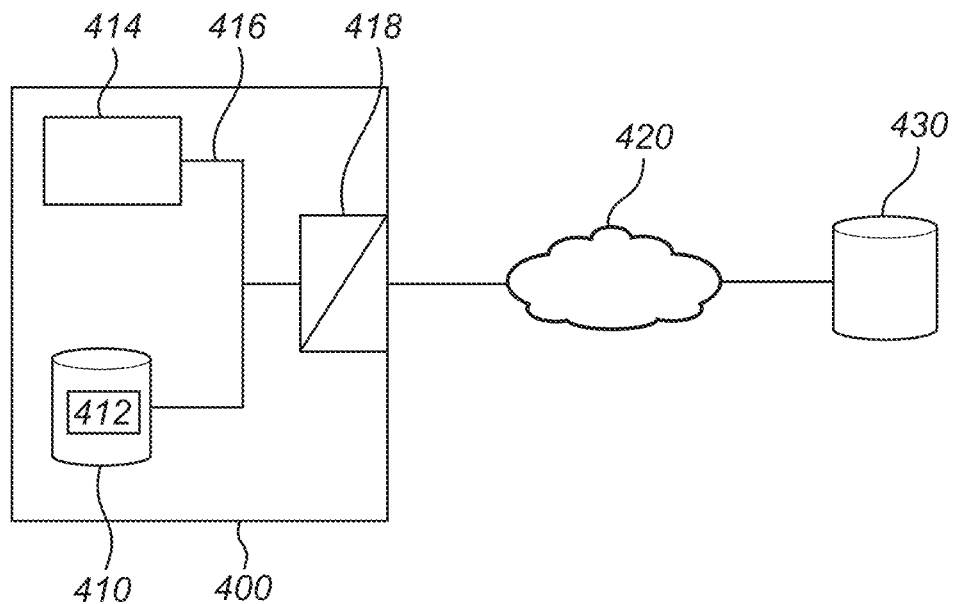
FIG. 4 is a block diagram of a device suitable for performing the methods in FIGS. 1 and 2.
FIGS. 5 and 6 illustrate spectrum sparsening operations that include rotation of a graphical element.

FIGS. 5 and 6 illustrate spectrum sparsening operations that include rotation of a graphical element.

Said rotation may be defined in such manner as to reduce the number of unique line orientations in a coding block. In the left-hand half of FIG. 5, the sign "/" (forward slash) is approximately parallel to the left stroke of the letter "A", so that it may be expected that these graphical features can be encoded using the same or partially same basis functions. In the right-hand half of FIG. 5, however, the sign "/" and the left stroke of the letter "A" have distinct orientations, which will require a larger number of transform coefficients to have nonzero values. In view of this, some embodiments of the method 100 include performing a spectrum sparsening operation that modifies a layout according to the right-hand half of FIG. 5 to be more similar to the left-hand half of FIG. 5.

Said rotation may be defined in such manner as to align a line orientation with a vertical or horizontal axis, or even to align it with the diagonal of these axes. The vertical or horizontal axis correspond to the axes of the pixel matrix of the digital raster image to be rendered, and this is how the basis functions are parameterized ($n_1$, $n_2$ variables). In the right-hand half of FIG. 6, the letter "L" is not aligned with the axes of the coding block. Here, the axes correspond to the boundaries of the coding block where the letter "L" is contained, which are drawn in dotted line. The unaligned letter "L" will be costly to encode as it cannot be expressed as a combination of a small number of basis functions. The orientation in the left-hand half of FIG. 6 is likely to be more favorable from the point of view of the block-wise transform coding. For this reason, some embodiments of the method 100 include performing a spectrum sparsening operation that modifies a layout according to the right-hand half of FIG. 6 to be more similar to the left-hand half of FIG. 6.

Figures 7, 8, 9, 10:
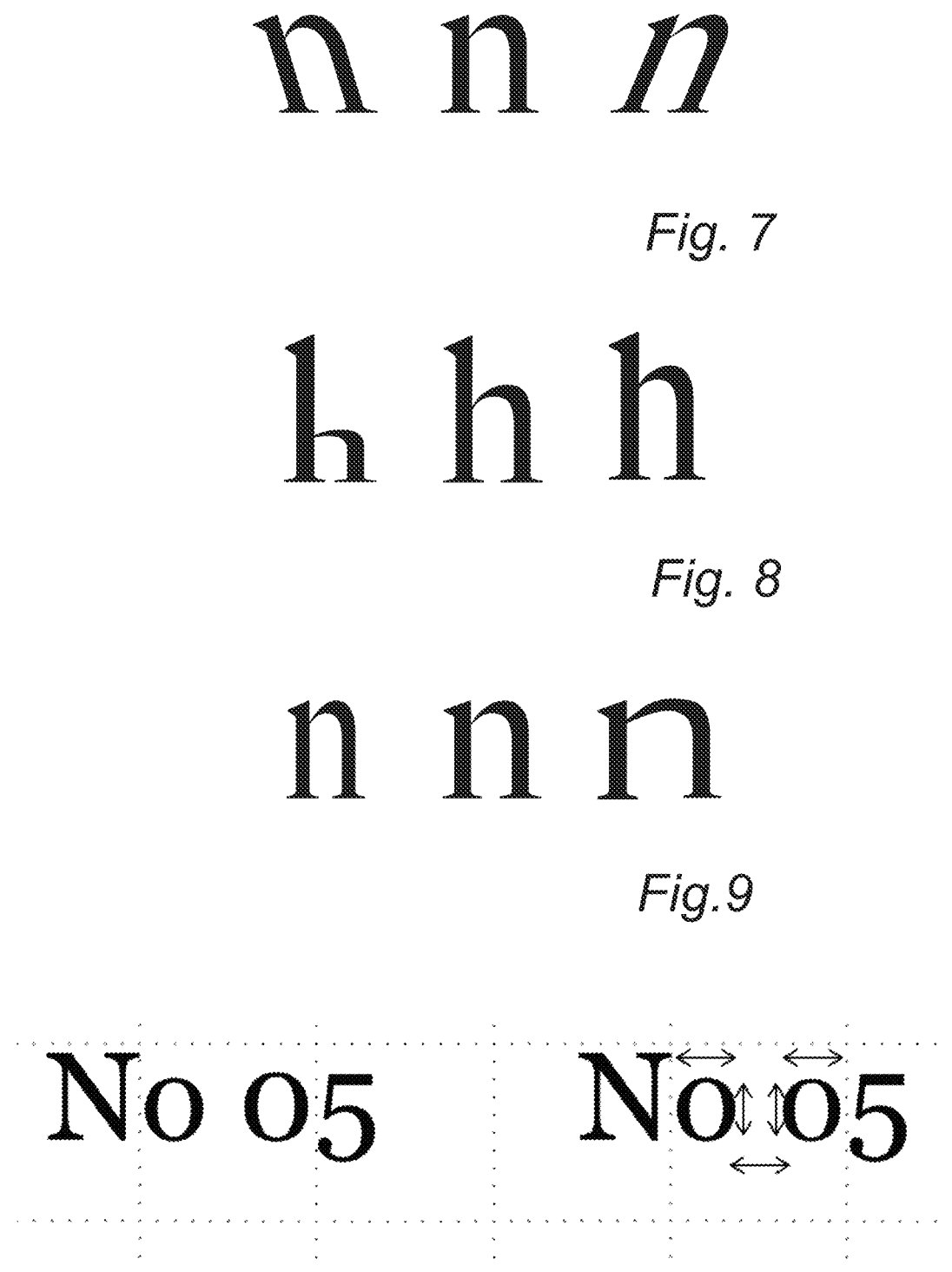

FIG. 7 illustrates a spectrum sparsening operation that includes slanting a graphical element. Slanting in the rightward direction may in some typefaces correspond to gradually italicizing letters. Conversely, slanting may be used to de-italicize one or more letters to some extent, whereby their strokes (e.g., cross bar, shoulder, bowl, stem) may end up in better alignment with the vertical or horizontal axis, or with the diagonal direction. The slanting could contribute to reducing the number of unique line orientations in a coding block, to aligning a line orientation with a vertical or horizontal (or diagonal) axis and/or to reducing the number of unique vertical or horizontal distances in a coding block. A "distance" in a coding block may be a thickness of a stroke or the length of a separation (space, gap). It is noted furthermore that because a basis functions are periodic, the transform coding will effectively sample a periodic extension of the coding block, and thus the spectrum sparsening operation should be designed to minimize the number of unique distances in a periodic extension of the coding block; this will be illustrated below with reference to FIG. 12.

FIGS. 8 and 9 illustrate spectrum sparsening operations that include local rescaling of graphical elements and/or anisotropic rescaling of graphical elements.

In FIG. 8, it is shown how the x-height of the lowercase letter "h" can be varied by local rescaling in the vertical direction, which allows the number of unique vertical distances to be limited. No horizontal rescaling is applied in FIG. 8. It is noted that the shape in the middle of FIG. 8, provided that the letter "h" occupies a full coding block in the vertical direction, has a single vertical distance since the x-height is approximately half of the cap height. Probably, the left-hand and right-hand shapes in FIG. 8 include at least two unique vertical distances (i.e., x-height and ascender height), and they will therefore require a larger number of nonzero transform coefficients. Accordingly, some embodiments of the method 100 include performing a spectrum sparsening operation that could modify a layout to be more similar to the middle shape in FIG. 8.

FIG. 9 illustrates the effect of a global rescaling in the horizontal direction only, which is an example of an anisotropic rescaling. By such rescaling, the number of unique distances in a coding block can be influenced. Anisotropic rescaling also includes a combination of horizontal and vertical rescaling operations by different factors.

FIG. 10 illustrates an example where rescaling operations can be put to use for the purpose of spectrum sparsening. The left-hand half of FIG. 10 corresponds to a tentative layout, where the lowercase letter "o" and the number "0" (zero) occupy a common coding block. The letter "o" is slightly lower and narrower than the number "0". The right-hand half of FIG. 10 corresponds to the output of a spectrum sparsening operation, in which the full graphical element representing the number "0" is isotropically downscaled to have an equal height as the letter "o". As part of the spectrum sparsening operation, it is furthermore ensured that the horizontal space between the letter "o" and the number "0" is approximately equal to the width of the letter "o"; this may be achieved by translating the letter "o" or the number "0" in the horizontal direction. As a result, the three horizontal distances indicated by arrows are approximately equal, as are the two vertical distances. Based on these considerations, some embodiments of the method 100 include performing a spectrum sparsening operation that modifies a layout according to the left-hand half of FIG. 10 to be more similar to the right-hand half of FIG. 10. It is noted that, because the transform coding is block-wise, it is not necessary to consider the adjacent letter "N" and number "5" in the adjacent coding blocks.

Figure 11:
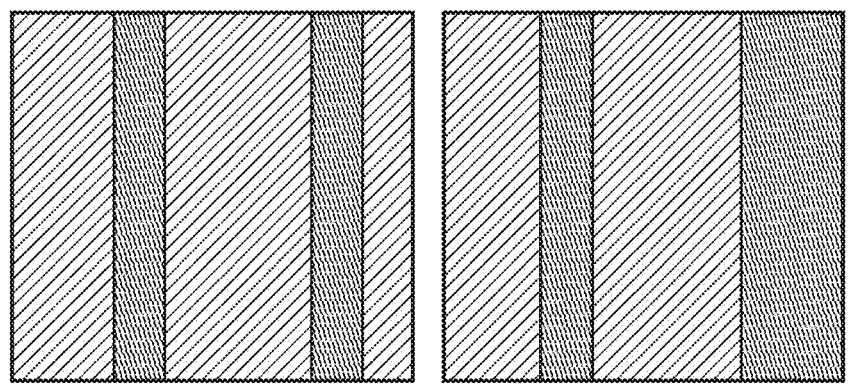
FIGS. 11 and 12 show coding blocks of a raster image.
Figure 12:
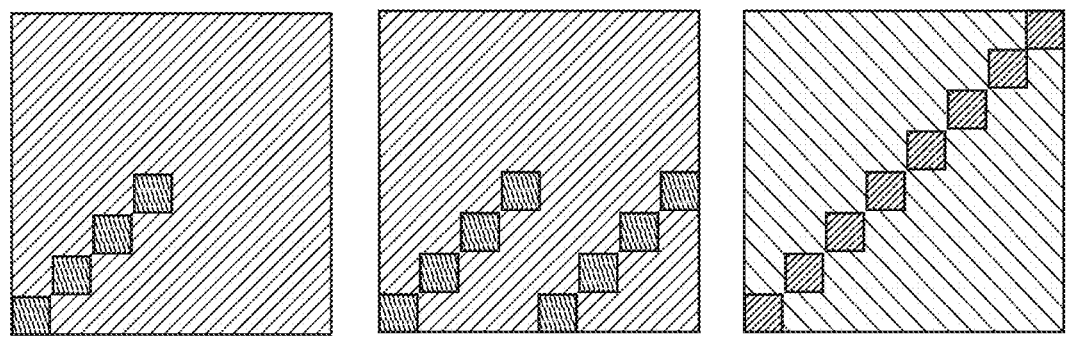

To illustrate the effects of the spectrum sparsening operation on pixel level, FIGS. 11 and 12 show 8×8 pixel coding blocks of a raster image. In the left-hand half of FIG. 11, the lines have a uniform horizontal thickness of 1 dark pixel, and they are horizontally separated by 3 light pixels. For the reasons explained above, the horizontal periodic extension of the coding block is considered, in which the outer light pixels combine to a total separation of 2+1=3 light pixels. Conceptually, the vertical boundaries of the coding block may be considered 'glued together', and the horizontal boundaries too. In the right-hand half of FIG. 11, by contrast, one discerns in the horizontal direction 2 light pixels, 1 dark pixel, 3 light pixels and 2 dark pixels. Because the number of unique horizontal distances is greater in the right-hand half of FIG. 11, it will be costlier to encode. Accordingly, some embodiments of the method 100 include performing a spectrum sparsening operation that modifies a layout according to the right-hand half of FIG. 11 to be more similar to the left-hand half of FIG. 11.

In the first coding block in FIG. 12, the upper portion contains constant image data and the lower portion, where a graphical element resembling a forward slash is present, contains the horizontal distances 1 and 7. (It is recalled that the distances in the periodic extension are relevant.) In the second coding block in FIG. 12, the one in the middle, the upper portion contains constant image data and the lower portion, where two copies of the graphical element are present, contains the horizontal distances 1 and 3. This suggests that the respective costs of coding the first and second coding blocks in FIG. 12 are approximately equal. Accordingly, it will benefit coding efficiency to gather the two copies of said graphical element in the same coding block, rather than using a layout where they are located in two different coding blocks. Further, it is instructive to consider the third coding block in FIG. 12, which contains the horizontal distances 1 and 7 over its entire vertical extent. The third coding block may be expected to have an even greater number of zero-valued transform coefficients than the first and second coding blocks in FIG. 12. The third coding block in FIG. 12 can be obtained from the second coding block by translating the right-hand graphical element upward until it is aligned with the left-hand graphical element.

In view of these considerations, some embodiments of the method 100 include performing a spectrum sparsening operation that includes a translation of one or more graphical elements such that geometrically similar graphical elements are gathered in one coding block and/or such that geometrically dissimilar graphical elements are separated into different coding blocks. Thereby, the number of unique line orientations and/or the number of unique vertical or horizontal distances in a coding block is likely to be reduced.

FIGS. 13, 14, 15 and 16 illustrate spectrum sparsening operations that include translation of graphical elements. As mentioned, an aim of such translations may be to gather geometrically similar graphical elements and/or separate geometrically dissimilar graphical elements per coding block. These expressions may be understood in their ordinary meaning. Alternatively, in some embodiments, the identification of "geometrically similar" and "geometrically dissimilar" graphical elements may be systematized into identifying spectrally similar and spectrally dissimilar graphical element. This is achieved by caching spectra (transform coefficients) from an earlier block-wise transform coding of various graphical elements. The spectra may be cached in full or in a simplified format; a useful simplified format may state which transform coefficients are nonzero in each spectrum. For example, two graphical elements may be taken to be spectrally similar if they have identical or nearly identical sets of nonzero transform coefficients, and they are taken to be spectrally dissimilar otherwise. Spectrally similar graphical elements shall be gathered and spectrally dissimilar graphical elements shall be separated into different coding blocks.

To avoid too nearsighted (non-global) optimization of the placement of graphical elements, such spectrum sparsening operations that include translation of graphical elements are preferably applied to a search window of multiple adjacent coding blocks at a time. Within the search window, a number of possible redistributions of the graphical elements into different coding blocks is assessed and an advantageous one is selected. Among various possible redistributions of the graphical elements, a more suitable one may fulfil one or more of the following criteria: the total number of nonzero transform coefficients is smaller; the percentage of high-frequency coefficients (large values of $k_1$ and $k_2$) is smaller; there is a smaller variation of the composition of the set of nonzero transform coefficients between consecutive coding blocks (with respect to an intra prediction scanning order). Clearly, the characters in the text string are not permuted under said redistributions but they retain their sequence. In the interest of limiting the computational complexity, however, the window should not be too wide either, as may be the case if the entirety of a long text string is processed in a single spectrum sparsening operation. For example, the search window can include between 2 and 10 coding blocks in the direction of writing, such as 3, 4 or 5 coding blocks. Further, it is possible to use a sliding search window.

Figure 13:
FIGS. 13, 14, 15 and 16 illustrate spectrum sparsening operations that include translations of graphical elements.

FIG. 13 illustrates the use of a translation for gathering geometrically similar graphical elements per coding block. In the left-hand half of FIG. 13, the left coding block is shared by the letter "F" and a fragment of a character "\" (backslash), while the right coding block contains one partial and two full copies of the character "\". This is potentially suboptimal for coding purposes, on the one hand, because the letter "F" and the fragment of the character "\" are geometrically dissimilar. It is further suboptimal because the character "\" occupies two coding blocks. In a periodic extension of the coding block, where the two vertical boundaries are imagined 'glued together', this corresponds to a major discontinuity, which is costly to express in periodic basis functions. In the right-hand side of FIG. 13, then the three copies of the character "\" have been translated to the right, so that all three are contained in the right coding block, and the letter "F" is alone in the left coding block. Because there are just two unique line orientations in the left coding block and a single unique line orientation in the right coding block, this translation can be expected to reduce the total number of nonzero transform coefficients that results. Further, the translation also has reduced the number of coding blocks occupied by the leftmost character "\". In view of this, some embodiments of the method 100 include performing a spectrum sparsening operation that modifies a layout according to the left-hand half of FIG. 13 to be more similar to the right-hand half of FIG. 13.

Figure 14:
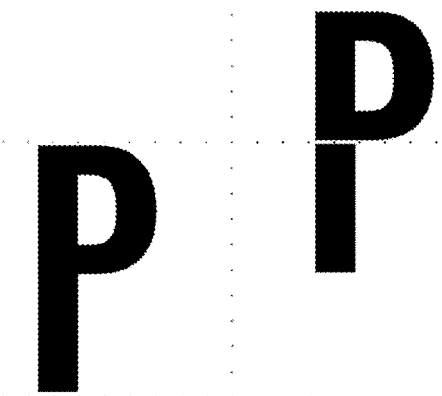

FIG. 14 illustrates the use of a translation for separating geometrically dissimilar graphical elements per coding block. In the left-hand half of FIG. 14, a graphical element representing the letter "P" is contained in one coding block. Because the bowl and stem of this letter are geometrically dissimilar, it will have to be expressed by a relatively large number of basis functions, i.e., at relatively high cost. This can be improved, for example, by splitting the letter into one "D"-like part and one "I"-like part and translating these into two different coding blocks, as shown in the right-hand half of FIG. 14, where the separation between the parts has been exaggerated for visibility. This illustrates that the characters of the text string and the graphical elements can be in one-to-many relationship. Alternatively, the letter "P" could have been split into one "I"-like part and one part resembling a horizontally flipped "C", to be placed in two different coding blocks. In view of this, some embodiments of the method 100 include performing a spectrum sparsening operation that modifies a layout according to the left-hand half of FIG. 14 to be more similar to the right-hand half of FIG. 14.

Figure 15:
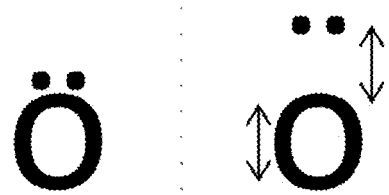

FIG. 15 illustrates the use of translations for rearranging graphical elements within one coding block, for thereby reducing the number of unique vertical distances in a coding block. In the left-hand half of FIG. 15, two graphical elements in the form of umlaut dots are located close to a third graphical element representing a lowercase letter "o". The coding block thus has a multitude of vertical distances. In the right-hand half of FIG. 15, by contrast, the umlaut dots have been translated upward to be located approximately as high above the "o" as the height of the "o" itself. As a result, the vertical distances corresponding to the thicknesses of the dots and "o" are approximately equal. Further, the space corresponding to the height of the "o" (x-height, lower vertical double arrow), the vertical space from the umlaut dots to the top of the "o" (upper vertical double arrow) and the sum of the free space above and below the complete letter "o" in the coding block constitute a triplet of approximately equal spaces. (It is recalled that the distances in the periodic extension of the coding block are what matter most; for vertical distances, the vertical periodic extension is to be considered.) Accordingly, some embodiments of the method 100 include performing a spectrum sparsening operation that modifies a layout according to the left-hand half of FIG. 15 to be more similar to the right-hand half of FIG. 15.

Figure 16:
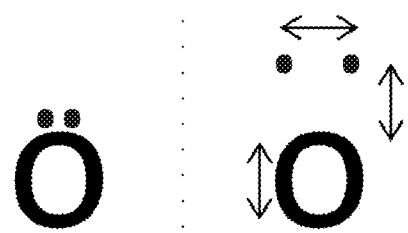

FIG. 16 illustrates the use of translations for rearranging graphical elements within one coding block, for thereby reducing the number of unique vertical and horizontal distances in a coding block. The left-hand half of FIG. 16 is identical to the left-hand half of FIG. 15. In the right-hand half of FIG. 16, the umlaut dots have not only been translated upward—like in FIG. 15—but they have also been further spaced apart by a horizontal translation, to have the approximate same horizontal spacing as the width of the "o". In the right-hand half of FIG. 16, not only the number of unique vertical distances but also the number of unique horizontal distances have been minimized. This may, to some extent, be advantageous in view of later prediction coding. The translation may represent an even more significant advantage if intra-frame prediction coding is applied. Accordingly, some embodiments of the method 100 include performing a spectrum sparsening operation that modifies a layout according to the left-hand half of FIG. 16 to be more similar to the right-hand half of FIG. 16.

Starting from the right-hand half of FIG. 16, an even further spectral sparsening can be obtained by transforming the umlaut dots into an umlaut overbar, which may be accepted as an allograph by some readers. To illustrate this mathematically, the following pixel representation of the right-hand half of FIG. 16 is considered:

$$\begin{bmatrix} 0 & 0 & 0 & 0 & 0 & 0 & 0 & 0 \\ 0 & 0 & 1 & 0 & 0 & 1 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 1 & 1 & 1 & 0 & 0 \\ 0 & 0 & 1 & 0 & 0 & 1 & 0 & 0 \\ 0 & 0 & 1 & 0 & 0 & 1 & 0 & 0 \\ 0 & 0 & 1 & 1 & 1 & 1 & 0 & 0 \end{bmatrix}.$$

The DCT spectrum of such a coding block has the following appearance, where * denotes a nonzero transform coefficient:

$$\begin{bmatrix} * & 0 & * & 0 & * & 0 & * & 0 \\ * & 0 & * & 0 & * & 0 & * & 0 \\ * & 0 & * & 0 & * & 0 & * & 0 \\ * & 0 & * & 0 & * & 0 & * & 0 \\ * & 0 & * & 0 & * & 0 & * & 0 \\ * & 0 & * & 0 & * & 0 & * & 0 \\ * & 0 & * & 0 & * & 0 & * & 0 \\ * & 0 & * & 0 & * & 0 & * & 0 \end{bmatrix}.$$

If the umlaut dots are replaced by an umlaut overbar, as follows:

$$\begin{bmatrix} 0 & 0 & 0 & 0 & 0 & 0 & 0 & 0 \\ 0 & 0 & 1 & 1 & 1 & 1 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 1 & 1 & 1 & 0 & 0 \\ 0 & 0 & 1 & 0 & 0 & 1 & 0 & 0 \\ 0 & 0 & 1 & 0 & 0 & 1 & 0 & 0 \\ 0 & 0 & 1 & 1 & 1 & 1 & 0 & 0 \end{bmatrix},$$

then the DCT spectrum becomes $$\begin{bmatrix} * & 0 & * & 0 & * & 0 & * & 0 \\ * & 0 & * & 0 & * & 0 & * & 0 \\ * & 0 & * & 0 & 0 & 0 & * & 0 \\ * & 0 & * & 0 & * & 0 & * & 0 \\ 0 & 0 & * & 0 & * & 0 & * & 0 \\ * & 0 & * & 0 & * & 0 & * & 0 \\ * & 0 & * & 0 & 0 & 0 & * & 0 \\ * & 0 & * & 0 & * & 0 & * & 0 \end{bmatrix}.$$

It is seen that the number of nonzero transform coefficients decreases by three, so that the coding block can be digitally represented more compactly.

As mentioned above, step 118 may include a preprocessing step of joining one or more graphical elements. The joining is potentially useful in the context of spectral sparsening operations by translation, where it could improve the visual appearance of the modified layout. For example, the joining could make uneven spaces between letters look more even and thus less visible. Another use is to fulfil a layout constraint which specifies a minimum extent 334 (FIG. 3) of the text string in the image area 310. For example, letters of a text string representing a word can be distributed over said minimum extent 334 but, thanks to ligatures, still be perceived as a word. The joining of letters typically adds negligible coding effort and may even be beneficial. In the particular case of Arabic script, such joining can be achieved by so-called kashida, that is, by extending portions of the graphical elements or inserting glyphs (tatwil) that act as ligatures. For further details, reference is made to the research paper M. J. E. Benatia et al., "Arabic text justification. Survey of historical methods of Arabic text justification, and a recommended algorithm", *TUGboat*, vol. 27 (2006), no. 2, page 137-146.

FIGS. 17, 18, 19 and 20 illustrate spectrum sparsening operations that include various typeface modifications or typeface substitutions. In general terms, the typeface modifications and typeface substitutions to be reviewed simplify a geometric shape of a graphical element. This could contribute to reducing the number of unique line orientations in a coding block, to aligning a line orientation with a vertical or horizontal (or diagonal) axis and/or to reducing the number of unique vertical or horizontal distances in a coding block. It is noted that if the method 100 is performed subject to a layout constraint that specifies a typeface or a list of acceptable typefaces, the typeface substitutions under consideration must be restricted accordingly.

Figure 17:
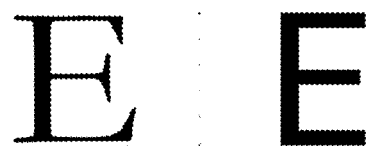
FIGS. 17, 18, 19 and 20 illustrate spectrum sparsening operations that include various typeface modifications.

FIG. 17 illustrates a typeface modification by which a graphical element that represents the uppercase letter "E" in a serif typeface (left-hand half of FIG. 17) is transformed into an allograph for "E" without the serifs (right-hand half). In other words, the transformation simplifies a terminal shape of the graphical element, namely, by removing the serifs. The typeface modification further uniformizes the widths of the different strokes on the letter "E". Because the graphical element in the right-hand half of FIG. 17 has fewer unique line orientations and/or fewer unique distances, it is likely cheaper to encode. In view of this, some embodiments of the method 100 include performing a spectrum sparsening operation that modifies a layout according to the left-hand half of FIG. 17 to be more similar to the right-hand half of FIG. 17. Equivalently, the spectrum sparsening operation could replace an "E" from a serif typeface with an "E" from a sans-serif typeface, particularly from a sans-serif typeface with uniform stroke width.

Figure 18:

FIG. 18 illustrates a typeface modification by which typeface weights within a coding block are uniformized. Example typeface weights include ultralight, light, demi, bold and heavy. In the left-hand half of FIG. 18, three graphical elements representing the lower case letter "a" have three different weights, which corresponds to a large number of unique vertical and horizontal distances in the coding block. In the right-hand half, the weights have been made approximately uniform—by means of typeface substitution or a suitable rescaling—which favors economical transform coding. Accordingly, some embodiments of the method 100 include performing a spectrum sparsening operation that modifies a layout according to the left-hand half of FIG. 18 to be more similar to the right-hand half of FIG. 18.

Figure 19:

It was shown with reference to FIG. 17 that the respective widths of different strokes on a graphical element can be uniformized. FIG. 19 illustrates a typeface modification by which a width of a particular stroke on a graphical element is made uniform. In the right-hand half of FIG. 19, graphical elements from a typeface with nonuniform stroke weights are used to form the text string "abc". In the left-hand half of the same figure, a typeface with uniform stroke weights is used. Further, the small ears and serifs seen in the right-hand half of FIG. 19 are not present in the left-hand half. Both of these changes tend to make the arrangement of graphical symbols in the left-hand half cheaper to encode. Accordingly, some embodiments of the method 100 include performing a spectrum sparsening operation that modifies a layout according to the right-hand half of FIG. 19 to be more similar to the left-hand half of FIG. 19.

FIG. 20 illustrates a typeface modification by which apertures of a graphical element can be modified. More precisely, FIG. 20 shows three graphical elements which represent the lowercase letter "e" and which differ with respect to the length of the lower open arc. The spacing from the apex up to the crossbar can be varied without the graphical element losing its significance as the letter "e". This fact can be utilized to control the number of unique horizontal and/or vertical distances in a coding block. In view of these considerations, some embodiments of the method 100 include performing a spectrum sparsening operation that transforms an aperture of a graphical element similar to the variation between the three graphical elements in FIG. 20.

FIG. 21 has been described above.

As the numerous examples have shown, the inventors are proposing a way of arranging the graphical elements that make up a given text string relative to a coding block pattern in a manner that facilitates efficient transform coding. More particularly, the inventors have developed a toolbox of operations for changing a tentative layout of graphical elements into a modified layout which has a sparser spectrum and can thus be represented more compactly. These operations leave the text string intact and thus preserve its communicative significance, and they are in general visually unnoticeable to nonexpert viewers. The discreetness of the spectrum sparsening operations can be further ensured by implementing one of those embodiments where layout constraints are accepted and observed.

The aspects of the present disclosure have mainly been described above with reference to a few embodiments. However, as is readily appreciated by a person skilled in the art, other embodiments than the ones disclosed above are equally possible within the scope of the disclosure, as defined by the appended patent claims. For example, while the examples have mainly been concerned with letters from the Latin alphabet, those skilled in the art will appreciate that the techniques disclosed herein are readily applicable to other scripts, such as Greek, Cyrillic, Arabic, and to ideographic scripts.

The invention claimed is:

1. A method for rendering a text string in a digital raster image suitable for block-wise transform coding, the method comprising:
    obtaining a partition of an image area into coding blocks for the block-wise transform coding;
    representing the text string as a plurality of graphical elements from a typeface which are arranged according to a tentative layout in the image area, wherein the tentative layout defines at least a position, orientation and size of each graphical element;
    modifying the tentative layout by applying a spectrum sparsening operation to at least one nonempty coding block, thereby obtaining a modified layout; and
    rendering a digital raster image of the graphical elements arranged according to the modified layout.

2. The method of claim 1, wherein the spectrum sparsening operation includes one or more of: rotation of a graphical element, slanting of a graphical element, isotropic or anisotropic rescaling of a full graphical element, isotropic or anisotropic rescaling of a graphical element of a portion of a graphical element, translation of a graphical element, a typeface modification, a typeface substitution, a contrast modification.

3. The method of claim 1, wherein the spectrum sparsening operation includes a rotation or slanting of a graphical element.

4. The method of claim 3, wherein the rotation or slanting reduces the number of unique line orientations in a coding block.

5. The method of claim 3, wherein the rotation or slanting aligns a line orientation with a vertical or horizontal axis.

6. The method of claim 1, wherein the spectrum sparsening operation includes an isotropic or anisotropic rescaling of a full graphical element or an isotropic or anisotropic rescaling of a graphical element of a portion of a graphical element.

7. The method of claim 6, wherein the rescaling reduces the number of unique vertical or horizontal distances in a coding block.

8. The method of claim 1, wherein the spectrum sparsening operation includes a translation of a graphical element.

9. The method of claim 8, wherein the translation gathers geometrically similar graphical elements and/or separates geometrically dissimilar graphical elements per coding block, for thereby reducing the number of unique line orientations and/or the number of unique vertical or horizontal distances in a coding block.

10. The method of claim 9, wherein the translation gathers spectrally similar graphical elements and/or separates spectrally dissimilar graphical elements per coding block on the basis of at least one cached spectrum from an earlier block-wise transform coding of these graphical elements.

11. The method of claim 8, wherein the translation rearranges graphical elements within one coding block, for thereby reducing the number of unique line orientations and/or the number of unique vertical or horizontal distances in a coding block.

12. The method of claim 8, wherein the translation reduces the number of coding blocks occupied by a graphical element.

13. The method of claim 1, wherein the spectrum sparsening operation includes a typeface modification or a typeface substitution.

14. The method of claim 13, wherein the typeface modification or typeface substitution simplifies a geometric shape of a graphical element.

15. The method of claim 13, wherein the typeface modification or typeface substitution includes one or more of: simplifying a terminal shape of a graphical element; removing an ear or serif on a graphical element; uniformizing a width of a stroke on a graphical element; uniformizing widths of multiple strokes on a graphical element; uniformizing typeface weights in a coding block; uniformizing apertures of one or more graphical element.

16. A device for rendering a text string in a digital raster image suitable for block-wise transform coding comprising a processor, configured to:
    obtain a partition of an image area;
    transforming the partition into coding blocks for the block-wise transform coding;
    represent the text string as a plurality of graphical elements from a typeface which are arranged according to a tentative layout in the image area, the tentative layout defining at least a position, orientation and size of each graphical element;
    modify the tentative layout by applying a spectrum sparsening operation to at least one nonempty coding block, thereby obtaining a modified layout; and
    render a digital raster image of the graphical elements arranged according to the modified layout.

17. A non-transitory computer storage medium having stored thereon instructions for implementing a method, when executed on a device having processing capabilities, for rendering a text string in a digital raster image suitable for block-wise transform coding, the method comprising:
    obtaining a partition of an image area into coding blocks for the block-wise transform coding;
    representing the text string as a plurality of graphical elements from a typeface which are arranged according to a tentative layout in the image area, wherein the tentative layout defines at least a position, orientation and size of each graphical element;
    modifying the tentative layout by applying a spectrum sparsening operation to at least one nonempty coding block, thereby obtaining a modified layout; and
    rendering a digital raster image of the graphical elements arranged according to the modified layout.

* * * * *